United States Patent

Martin

[15] 3,658,283
[45] Apr. 25, 1972

[54] EXTENDIBLE WIG RACK

[72] Inventor: Marie Therese Martin, 440 East 79th Street, New York, N.Y. 10021

[22] Filed: Nov. 18, 1969

[21] Appl. No.: 877,608

[52] U.S. Cl. .............................. 248/122, 223/66, 248/185
[51] Int. Cl. ......................................................... A47g 29/08
[58] Field of Search ................. 248/122, 121, 124, 125, 176, 248/177, 178, 185, 184, 183; 223/66, 84

[56] References Cited

UNITED STATES PATENTS

| 158,348 | 12/1874 | Wood | 248/122 |
| 1,231,635 | 7/1917 | Nelson | 248/124 X |
| 3,198,408 | 8/1965 | Benner | 223/66 |
| 3,227,409 | 1/1966 | Pagliuso | 248/183 |
| 3,503,581 | 3/1970 | Rouleau | 248/121 |

*Primary Examiner*—J. Franklin Foss
*Attorney*—Sherman and Shalloway

[57] ABSTRACT

A rack device for supporting a wig; which includes a base plate from which a lower shaft extends in one direction for receiving an upper shaft therein, and from which a plurality of stub shafts extend in the opposite direction to provide support therefor; said device further including a tapered spindle mounted on an angular extension of the upper shaft; which has an adjustment for the upper shaft for varying the amount of extension and rotation with the lower shaft; and which has an adjustment for the tapered spindle for varying the amount of rotation with the angular extension of the upper shaft.

3 Claims, 3 Drawing Figures

PATENTED APR 25 1972

3,658,283

INVENTOR
MARIE THERESE MARTIN

BY Sherman & Shalloway

ATTORNEYS

EXTENDIBLE WIG RACK

SUMMARY OF THE INVENTION

This invention relates to a wig rack which is both extensibly and rotatably adjustable.

The extensible adjustment is effected by providing two shafts with one telescopically fitted within the other, while the rotatable adjustment is effected by the rotation of one of the telescopically fitted shafts relative to the other of the telescopically fitted shafts on the one hand, and by the rotation of a tapered spindle mounted on an extension of said one of the telescopically fitted shafts with respect to the center line of said extension on the other hand.

In addition to the tapered spindle and shafts, the rack is also provided with a base plate for mounting the tapered spindle and shafts as a single unit, thereby obviating any need for independent support means.

It is accordingly an object of this invention to provide an improved rack which is readily adjustable both vertically and horizontally.

It is a further object of this invention to provide a rack which is a self-contained unit which does not require any additional supporting structure.

It is a still further object of this invention to provide a rack which is easily manufactured and assembled.

It is a still further object of this invention to provide a rack which is light in weight and thereby readily portable.

BRIEF DESCRIPTION OF THE DRAWINGS

The objects and advantages of this invention will be readily apparent from the following description and the attached drawings, in which.

DESCRIPTION OF THE PREFERRED EMBODIMENT

Figure 1:
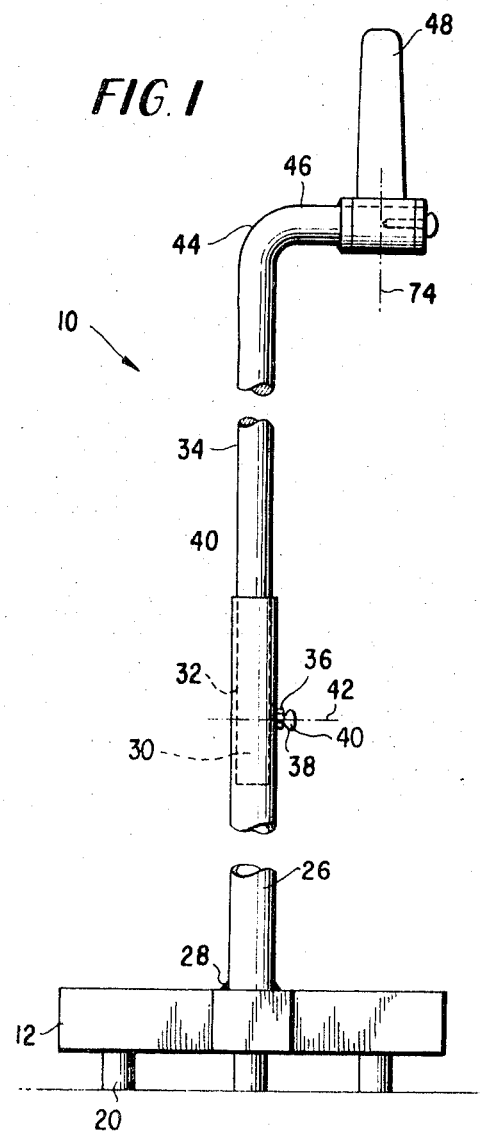
FIG. 1 is an elevation view of the rack assembly with the tapered spindle disposed vertically.
Figure 2:
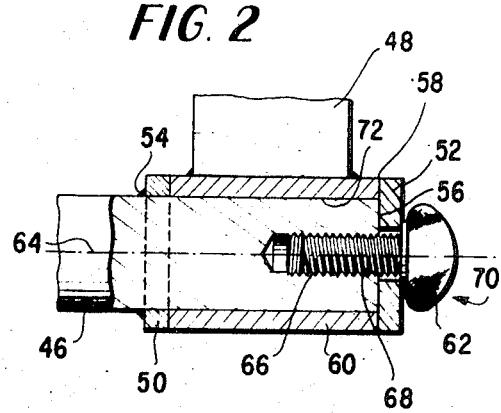
FIG. 2 is an enlarged view of the spindle hub and upper rod extension sub-assembly.
Figure 3:
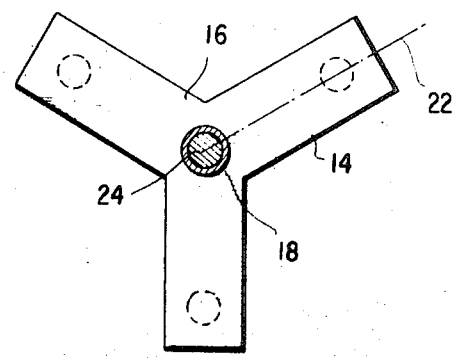
FIG. 3 is a top plan view taken on line 1 — 1 of FIG. 1 showing the lower rod and base plate.

Referring to the drawings wherein like reference characters designate like or corresponding parts throughout the different views, FIG. 1 shows a wig rack assembly for supporting a dummy head or block (not shown) for receiving a wig thereon for purposes of styling or the like.

The rack is fashioned into a stand 10 which has a base plate 12 at one end, and a tapered spindle 48 at the other end.

Base plate 12, which is the prime support structure for the stand, can be a simple rectangular plate, or as is shown, it can be a tripod having coplanar legs 14. The legs extend outwardly from a hub section 16 in which a bore 18 is formed. From the lower surface of said plate a set of stub legs 20 are made to extend into contact with a support surface. These legs are essentially stub shafts, one situated on each of the three legs 14 along its axis 22 and at the same radius from the center 24 of the bore 18.

From the upper surface of said plate a lower rod or shaft 26 extends. The lower shaft can be fastened to the base plate as by welding 28, or it can be made to threadly engage a taped bore formed in the base plate, or it can even be fabricated with the base plate as a single unit, although the weld construction is preferred because of its lower cost. It is also preferrable in said construction to have the shaft extend into bore 18 in at least a line-to-line fit with same and to make the weld circumferential so that the portion of said shaft which is received in bore 18 will serve to impart stability to the upper structure of the stand. The shaft itself is a hollow pipe with a bore 30 which can be extruded for the purpose or commercially purchased.

The bore 30 receives therein a portion 32 of upper rod or shaft 34 so that said upper shaft can be telescopically adjustable with respect to lower shaft 26. The adjustment is accomplished by a thumb screw assembly consisting of a weld nut 36 and thumb screw 38 which advances through weld nut 36 and lower rod 26 into abuting engagement with portion 32 in bore 30 creating a pressure point 40 between said portion and said screw in the vicinity of said abutting engagement and a corresponding reactive pressure over an arcuate area of portion 32 which is centered about a diametral line 42 extending through said pressure point 40. Upper shaft 34 extends out from bore 30 upwardly to elbow 44 from where it is angularly diverted and continues as extension 46. Extension 46, serves to mount a tapered spindle 48 thereon. The mounting area is defined by a pair of abutment washers 50 and 52. Washer 50 is fastened to extension 46 by weldment 54 while washer 52 contacts the concentrically arranged faces 56 of extension 46 and 58 of the sleeve or hub portion 60 of spindle 48 and is caused to exert pressure thereagainst by thumb screw head 62. Along center line 64 of extension 46 there is provided a taped hole 66 for receiving the threaded shank 68 of a thumb screw 70 which in turn creates the pressure referred to above. This pressure is reacted by washer 50, so that spindle 48 can be maintained in any desired angular position about axis 64. The tapered spindle consists of a hub portion or sleeve 60 having a bore 72, and an upwardly extending tapering portion with an axis 74 normal to center line 64.

In operation the rack is adjusted in height by lossening thumb screw 38, extending or inserting upper shaft 34 from or into bore 30 of lower shaft 26, rotating or not upper shaft 34 with respect to lower shaft 26, and then tightening thumb screw 38 to a pressure level sufficient to retain the relative position of said shafts; while the tapered spindle is angularly adjusted about center line 64 by loosening thumb screw 70, rotating said spindle thereabout and tightening the thumb screw 70 to a pressure level sufficient to retain said spindle in its rotated position.

A preferred embodiment of the invention having been described, which is set forth by way of example only and not intended to limit the invention to which modifications evidencing a reasonable range of equivalents will become apparent to those skilled in the art.

I claim:
1. A wig rack comprising:
   a. means for receiving an artificial head for supporting a wig thereon;
   b. an upper shaft;
   c. a lower shaft, said upper shaft engaging said lower shaft in slidable relation therewith;
   d. means for adjusting the engagement of said upper shaft and said lower shaft;
   e. a base plate, said lower shaft supported by said base plate;
   f. said upper shaft having an upper end section and a lower end section, said upper end section comprising an elbow extension angularly diverted from and perpendicular to said lower end section and adapted to support said receiving means, said receiving means comprising a tapered spindle mounted on said elbow extension and having positioning means for rotatably locating said spindle with respect to said elbow extension, said positioning means having a hollow bore, an abutment washer extending from one end of said positioning means and being welded to said elbow extension, a pressure plate member disposed at the end opposite said abutment washer, a thumb screw comprising a threaded shank and attached thereto a head for exerting pressure against said pressure plate member, said washer, pressure plate member, and thumb screw being disposed with respect to each other so that turning of said head causes the threaded shank to exert pressure which is reacted to by said washer, a tapped hole for receiving said threaded shank, said positioning means being adapted so that said spindle may be maintained in any desired angular position about the longitudinal axis of said elbow extension.

2. The device set forth in claim 1 wherein said upper shaft is telescopically slidable with respect to said lower shaft and the said adjusting means is mounted on said lower shaft.

3. The device set forth in claim 1 wherein said base plate has three equiangular and coplanar legs, said legs having support members extending therefrom.

* * * * *